Sept. 14, 1954   J. W. WHALEN   2,689,102
LEVELING SADDLE ASSEMBLY
Filed May 21, 1951
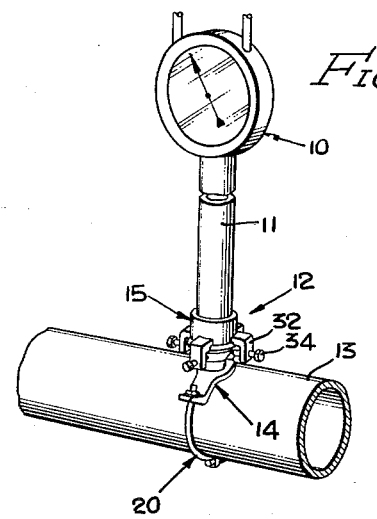
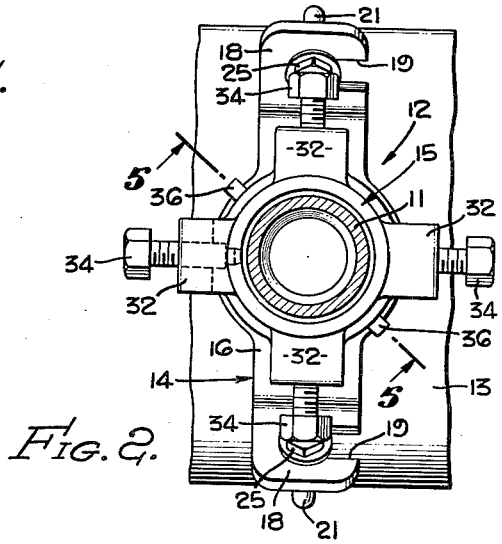
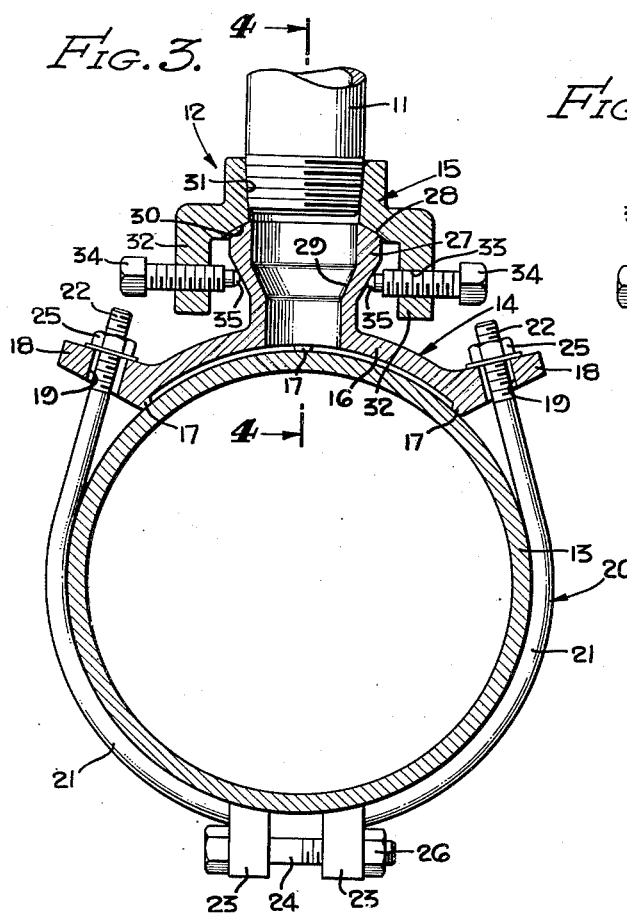
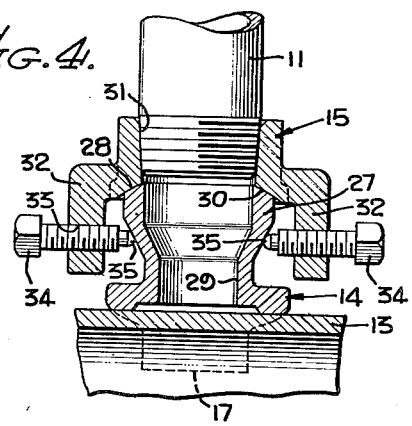
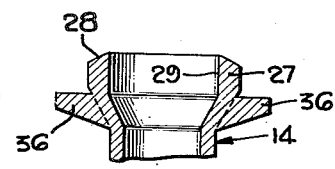
JOHN W. WHALEN,
INVENTOR.
BY Lyon Lyon
ATTORNEYS Patented Sept. 14, 1954

2,689,102

UNITED STATES PATENT OFFICE 2,689,102

LEVELING SADDLE ASSEMBLY

John W. Whalen, Inglewood, Calif., assignor to Daniel Orifice Fitting Company, Los Angeles, Calif., a corporation of California Application May 21, 1951, Serial No. 227,360

2 Claims. (Cl. 248—230)

This invention relates to a device for adjustably supporting a post on a cross-member and is particularly directed to an adjustable saddle for supporting a pipe in vertical position. Leveling saddle assemblies of this type are useful in supporting instruments such as meters at a spaced elevation above an approximately horizontal pipe. It is desirable that the meter support post be maintained in a vertical position for reasons of appearance and also in order that the meter may operate to the best efficiency. It is the principal object of this invention to provide an adjustable saddle assembly which is rugged in construction and has a minimum of operating parts, yet which provides for universal pivoting movement between the parts thereof.

A more particular object is to provide a two-part leveling saddle assembly having a joint between the parts formed on the surface of the sphere for universal tilting movement.

A more detailed object is to provide such a device having means for preventing relative rotation between the parts in order to facilitate threading of a pipe into one of the parts.

Other objects and advantages will appear hereinafter.

In the drawings:

Figure 1 is a perspective view partly broken away showing a preferred embodiment of my invention.

Figure 2 is a plan view thereof partly broken away, the meter being omitted.

Figure 3 is a transverse sectional elevation.

Figure 4 is a sectional view partly broken away taken substantially on the line 4—4 as shown in Figure 3.

Figure 5 is a sectional detail taken substantially on the line 5—5 as shown in Figure 2.

Referring to the drawings, a meter or other instrument 10 is fixed on the upper end of a tubular post or pipe 11. The leveling saddle assembly 12 embodying my invention is used for supporting the pipe 11 on the approximately horizontal support pipe 13 and for maintaining the pipe 11 in a vertical position. The assembly 12 includes the saddle member 14 and the collar member 15. The saddle 14 comprises an arcuate base 16 having spaced lugs 17 which engage the outer surface of the support pipe 13. Outwardly directed projections 18 are provided at the ends of the base 16, and these projections are each provided with a slot 19. A strap generally designated 20 extends around the circumference of the pipe 13 and is connected at its ends to the projections 18. As shown in the drawings, the strap takes the form of two curved rods 21 threaded at one end 22 and provided with an apertured block 23 on the other end. A bolt 24 connects the apertured blocks 23. Nuts 25 are threaded on the ends 22 which project through the slot 19. Tightening of the nuts 25 and nut 26 on the bolt 24 serves to anchor the base 16 securely on the support pipe 13.

A tubular head 27 is formed integrally on the base 16 and extends radially therefrom. The upper surface 28 of this head is formed as a portion of the surface of a sphere. The head 27 is also provided with a frusto-conical surface 29 diverging radially outwardly and positioned between the surface 28 and the base 16. The collar member 15 is provided with a spherical surface 30 which has surface contact with the surface 28 on the saddle member 14. The surfaces 28 and 30 thus provide a ball joint mounting for the collar member 15 on the saddle member 14 and permit the members to have relative universal tilting movement.

The collar member 15 is internally threaded at 31 to receive the lower end of the meter support post 11. The member 15 is also provided with a plurality of downwardly extending arms 32, each of which is provided with a threaded aperture 33 to receive a set screw 34. The inner end 35 of each set screw is tapered and engages the frusto-conical surface 29. Tightening of the set screws 34 serves to secure the members 14 and 15 against axial separation, and furthermore acts to hold them in selected angular relationship.

As shown in Figures 2 and 5, means is provided for preventing relative rotation between the members 14 and 15. As shown, this means includes the radially extending lugs 36 provided on the head 27, which lugs are engaged by the arms 32 when the collar member 15 is turned relative to the saddle member 14. These lugs are useful when the pipe 11 is being threaded into the opening 31 since they limit the turning of the collar member 15 relative to the saddle member 14.

In operation, the saddle member 14 is first mounted on the approximately horizontal support pipe 13. The strap 20 is installed and the nuts 25 and 26 tightened to secure the saddle member 14 in position. It is not essential that the pipe 13 be exactly horizontal, and a certain amount of inclination can be tolerated. Furthermore, it is not essential that the saddle member 14 be positioned on the circumference of the pipe 13 at precisely the highest elevation. The collar member 15 is then installed on the saddle member 14 with the spherical surfaces 28 and 30 in engagement. The meter support pipe 11 is then threaded into the opening 31 in the collar member 15. During this operation the lugs 36 are engaged by the legs 32 to prevent rotary movement of the collar 15. The meter support pipe 11 is then plumbed by means of a level or other suitable instrument and the set screws 34 are tightened against the frusto-conical surface 29 to maintain the pipe 11 in its vertical position. The meter 10 is then installed on the pipe 11 in the conventional manner.

If the approximately horizontal pipe 13 should settle in service or change its inclination slightly, the leveling saddle assembly 12 may be employed for readjusting the position of the pipe 11 to bring it back to a vertical position. This is accomplished merely by loosening the set screws 34, moving the pipe 11 to a vertical position, and then retightening the set screws 34.

Having fully described my invention, it is to be understood that I do not wish to be limited to the details herein set forth, but my invention is of the full scope of the appended claims.

I claim:

1. A leveling saddle assembly for a meter supporting post, comprising: a single piece mounting member having an arcuate portion adapted to conform to the curvature of a pipe and terminating at its arcuate extremities in a pair of angularly directed lugs, said mounting member also having a radially directed hollow boss enlarged at its extremity, its outer end surface being substantially spherical in contour, said boss being externally tapered adjacent its extremity; a U-strap adapted to encircle a pipe and cooperating with said lugs to secure said mounting member rigidly thereto; a single piece collar member having an internally screwthreaded end to receive a pipe section and also having axially directed lugs adapted to overhang the enlarged extended end of the boss, said collar having a spherically contoured surface between said lugs mating with the spherical end of said boss; and set screws extending through each of said collar lugs to engage the tapered portion of said boss, thereby to adjust the angular position of said collar relative to said boss.

2. A leveling saddle assembly as set forth in claim 1, wherein: the arcuate portion of said mounting member being a portion of a cylinder and is provided at its arcuate extremities and axial extremities with rudimentary pipe engaging bosses; and means is provided between said hollow boss and collar to limit relative rotation.

References Cited in the file of this patent

UNITED STATES PATENTS

| Number | Name | Date |
| --- | --- | --- |
| 596,207 | Hart | Dec. 28, 1897 |
| 864,588 | Young | Aug. 27, 1907 |
| 973,558 | Pierce | Oct. 25, 1910 |
| 1,447,212 | Kerr | Mar. 6, 1923 |
| 2,004,238 | Fithian | June 11, 1935 |
| 2,214,382 | Rastetter et al. | Sept. 10, 1940 |
| 2,497,933 | Devers | Feb. 21, 1950 |